US008314976B2

(12) United States Patent
Maeshima et al.

(10) Patent No.: US 8,314,976 B2
(45) Date of Patent: Nov. 20, 2012

(54) IMAGE READING APPARATUS (75) Inventors: Toshiyuki Maeshima, Sagamihara (JP); Daiki Nishioka, Hachioji (JP); Mitsutaka Morita, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 489 days.

(21) Appl. No.: 12/617,089

(22) Filed: Nov. 12, 2009

(65) Prior Publication Data
US 2010/0128327 A1 May 27, 2010

(30) Foreign Application Priority Data

Nov. 21, 2008 (JP) .................................. 2008-298716

(51) Int. Cl.
*H04N 1/04* (2006.01)
(52) U.S. Cl. .......................... 358/474; 358/498; 358/488
(58) Field of Classification Search .................. 358/474, 358/497, 498, 496, 488
See application file for complete search history.

(56) References Cited

U.S. PATENT DOCUMENTS

| 5,162,918 | A | * | 11/1992 | Muramatsu | ..................... | 358/300 |
| 5,180,915 | A | * | 1/1993 | Ohgoda | ......................... | 250/585 |
| 5,281,822 | A | * | 1/1994 | Albrecht et al. | ......... | 250/370.05 |
| 5,534,709 | A | * | 7/1996 | Yoshimoto et al. | ........... | 250/588 |
| 5,996,995 | A | * | 12/1999 | Kim et al. | ..................... | 271/303 |
| 6,024,288 | A | | 2/2000 | Gottlich et al. | | |
| 6,296,713 | B1 | | 10/2001 | Sugie et al. | | |
| 6,527,384 | B2 | * | 3/2003 | Isago | ............................ | 347/100 |
| 6,791,719 | B1 | * | 9/2004 | Hisada | .......................... | 358/473 |
| 7,283,758 | B2 | * | 10/2007 | Murakami | ...................... | 399/45 |
| 7,531,278 | B2 | * | 5/2009 | Sugino et al. | ................... | 430/66 |
| 7,851,114 | B2 | * | 12/2010 | Sugino et al. | ................ | 430/58.7 |
| 8,164,803 | B2 | * | 4/2012 | Roof | ............................. | 358/474 |

FOREIGN PATENT DOCUMENTS

| EP | 1 149 877 | 10/2001 |
| EP | 1 327 528 | 7/2003 |
| JP | 07-023185 | 1/1995 |
| JP | 2001-302954 A | 10/2001 |
| JP | 2004-074652 | 3/2004 |
| WO | WO 02/48936 | 6/2002 |

OTHER PUBLICATIONS

European Search Report issued in corresponding Application No. 09175442.4-2202 dated Jan. 18, 2010.
Notice of Reasons for Refusal dated Oct. 13, 2010, issued in the corresponding Japanese Patent Application No. 2008-298716, and an English Translation thereof.
Chinese Office Action dated Feb. 29, 2012 issued in the corresponding Chinese Patent Application No. 200910224766.7 and English translation thereof.

* cited by examiner

*Primary Examiner* — Negussie Worku
(74) *Attorney, Agent, or Firm* — Buchanan Ingersoll & Rooney PC (57) ABSTRACT

An image reading apparatus comprising: an automatic document feeding apparatus which conveying a document that has a part written by pigment that becomes colorless when heated and is loaded in a document tray to a sheet discharge location via a conveying path that passes through a prescribed reading out position; a reading section for obtaining an image information by reading out optically from the document which is conveyed by the automatic document feeding apparatus at the reading out position; a storage section for storing the image information obtained by reading the document in the reading section; and a heating unit for heating the document in a temperature of the pigment becomes colorless on a downstream side of the reading out position while the document passing through the conveying path.

7 Claims, 5 Drawing Sheets

IMAGE READING APPARATUS

RELATED APPLICATION

The present application is based on Patent Application No. 2008-298716 filed at the Japan Patent Office on Nov. 21, 2008 and which is hereby incorporated herein in its entirety.

TECHNICAL FIELD

The present invention relates to image reading apparatuses that optically read out documents, and in particular, to image reading apparatuses that are suitable for reading out documents that include parts that have been drawn using a pigment that becomes colorless when heated.

BACKGROUND

Conventionally, from the point of view of the effective use and reuse of paper resources, there are writing instruments that use inks that become colorless when heated to a high temperature such as above 60° C., etc. Further, there are ink jet printers that have a recording section using inks that become colorless when heated and a heating section that is placed before said recording section and that makes the ink colorless (see, for example, Japanese Patent Application Publication No. 2001-302954).

In a situation such as reading out by scanning the personal information written in questionnaires and converting it to an electronic form, and managing it by storing it in a data base, etc., it is required to appropriately dispose of the paper after converting to an electronic form thereby preventing the leakage of personal information. In such cases, if the entering is done using a writing instrument using an ink such as the above that becomes colorless upon heating, it is possible to erase the entered part by heating the sheet after it has been read out and the information is converted into an electronic form, and hence it is possible to prevent the leakage of personal information. In addition, if only the entered part can be erased, it is also possible to use the sheet again as a questionnaire form that has not been filled in.

However, in a work flow in which, after reading by a scanner and converting the information to an electronic form, the sheet is erased by heating in a different apparatus, there is no guarantee that the erasing operation is definitely done after reading out and converting to an electronic form. In addition, if the time of leaving the document after reading and converting to an electronic form until the erasing operation is carried out becomes long, the possibility of information leakage becomes correspondingly higher.

The present invention was made with the aim of solving the above problem, and the purpose of the present invention is to provide an image reading apparatus that can, after reading out and converting to an electronic form a document containing a part that is written using a pigment that becomes colorless when heated, quickly erase the part that is written in such an ink.

SUMMARY

The aspects of the present invention are any one of the image reading apparatus described as follows.

An image reading apparatus comprising:

an automatic document feeding apparatus which conveys a document that has a part written by pigment that becomes colorless when heated and is loaded in a document tray to a sheet discharge location via a conveying path that passes through a prescribed reading out position;

a reading section for obtaining an image information by reading out optically from the document which is conveyed by the automatic document feeding apparatus at the reading out position;

a storage section for storing the image information obtained by reading the document in the reading section; and a heating unit for heating the document to a temperature at which the pigment becomes colorless on a downstream side of the reading out position while the document passes through the conveying path.

In the above invention, on the downstream side of the reading out position provided in the middle of the conveying path through which the automatic document feeding apparatus conveys the document, a heating unit is provided that heats the document so that the pigment becomes colorless upon heating becomes colorless. Because of this, it is possible to make the reading out of the document and the heating and erasing operation of making said pigment colorless immediately after reading out sequential.

According to an image reading apparatus of the present invention, after reading out and converting to an electronic form a document having a part written by a pigment that becomes colorless when heated, it is possible to quickly erase that part written using that pigment, and the leakage of information due to leaving the document after reading out and converting to an electronic form until the erasing operation is made is suppressed.

DESCRIPTION OF THE PREFERRED EMBODIMENT

A preferred embodiment of the present invention is explained here referring to the drawings.

Figure 1:
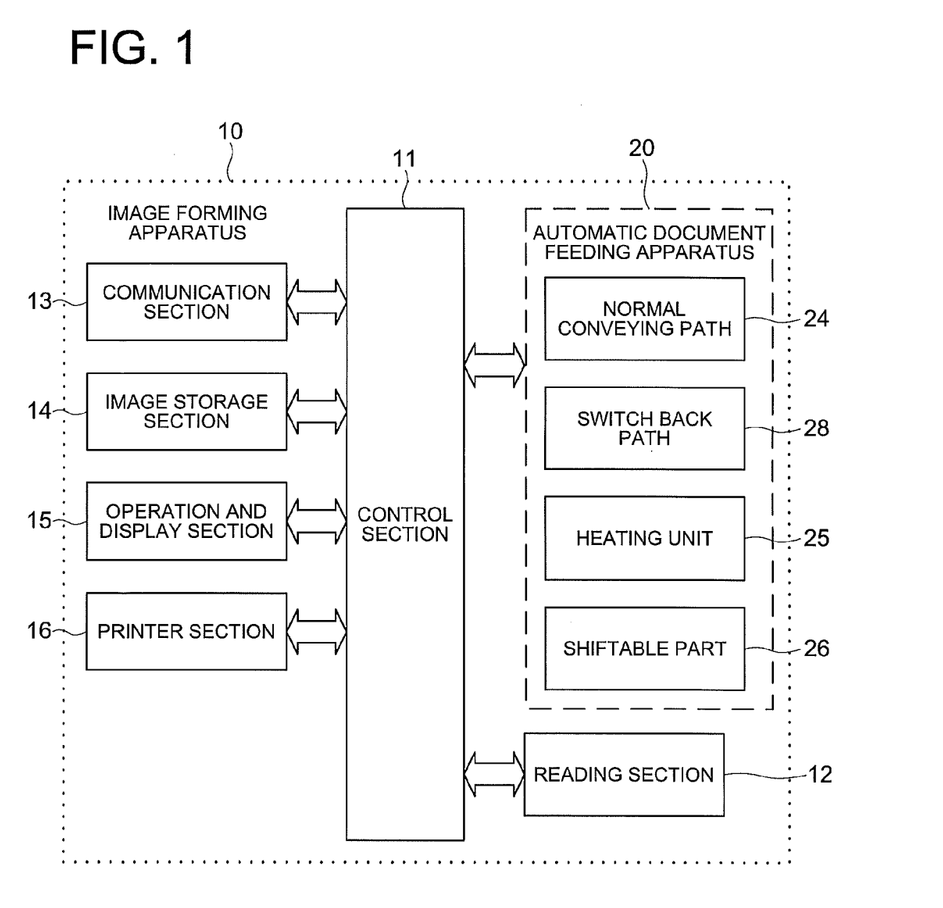
FIG. 1 is a block diagram showing the configuration of an image forming apparatus according to a preferred embodiment of the present invention.

FIG. 1 is a block diagram showing the configuration of an image forming apparatus 10 that includes the function of an image reading apparatus according to a preferred embodiment of the present invention. The image forming apparatus 10 is configured to have the scanning function of obtaining the image data by optically reading out a document and either storing that image data or transmitting it to an external terminal, the copying function of reading out a document and also printing out on a recording sheet a copy image of the document based on the image data that was obtained by reading out, and the printer function of printing out on a recording sheet the image obtained by rasterizing the print data received from an external terminal, etc., that is, the apparatus is configured as a multiple function peripheral.

Further, the image forming apparatus 10 has the function of, in sequence with the operation of reading out a document written using a pigment that becomes colorless when heated (hereinafter referred to as "decolorizable pigment"), making colorless the decolorizable pigment by heating the document after reading it out.

The image forming apparatus 10 is configured by connecting to a control section 11 that comprehensively controls the operation of that image forming apparatus 10, an automatic document feeding apparatus 20, a reading section 12, a communication section 13, an image storage section 14, an operation and display section 15, and a printer section 16. The control section 11 is configured using a CPU (Central Processing Unit), a ROM (Read Only Memory), a RAM (Random Access Memory), a non-volatile memory, etc., which have not been shown in the figure, as its major sections. Various types of programs is stored in the ROM, and the different functions of the image forming apparatus 10 are realized by the CPU executing the processing according to these programs. The RAM is used as a working storage for temporarily storing various types of data when the CPU is executing the programs. The user information or the different types of setting information that need to be stored even when the power supply to the apparatus has been switched off are stored in the non-volatile memory.

The automatic document feeding apparatus 20 has the function of separating out and issuing one sheet at a time from the document loaded in the document tray, and conveying it to the document discharge location after passing through a conveying path which passes through a prescribed reading out position. The details of the automatic document feeding apparatus 20 are described later.

The reading section 12 carries out the function of optically reading out at said reading out position the document conveyed by the automatic document feeding apparatus 20 and obtaining the image data. The reading section 12 is configured using a close contact type line image sensor that, when light is emitted onto the document, reads out the document by receiving the light reflected from the document and reading out the data of one line in the main scanning direction that is at right angles to the direction of conveying the document (the auxiliary scanning direction), and the document is read out as a two dimensional image by repeating the reading operation in units of a line in the main scanning direction while the document is being conveyed by the automatic document feeding apparatus 20 in the conveying direction (the auxiliary scanning direction). The reading section 12 converts the analog signal output by the line image sensor into digital image data and outputs it.

The communication section 13 carries out the function of connecting to a network such as a LAN (Local Area Network) or the Internet and communicating with various types of apparatuses on the network. For example, it is used when transmitting the image data obtained by reading out by the reading section 12 to an external terminal or for receiving print data from an external terminal.

The image storage section 14 is a non-volatile large capacity storage device used for storing the image data obtained by reading out using the reading section 12, etc. Here, the image storage section 14 is configured using a hard disk drive unit and its controller.

The operation and display section 15 carries out the function of displaying various types of operation screens or setting screens, selection screens, guidance screens, etc., and the functions of receiving various types of operations by the user. Here, this is constituted by a liquid crystal display (LCD) that carries out the display functions, and a touch panel that is formed on the surface of that liquid crystal display and that detects the position coordinates of the location where it is pressed, and ten keys, start button, and various types of operation switches, etc.

The printer section 16 carries out the function of printing on a recording sheet an image corresponding to the input image data and outputting it. The printer section 16 has a conveying apparatus for the recording sheets, photoreceptor drums, charging units, laser units, developing units, transfer and separation units, cleaning units, and a fixing unit, and forms images using an electro-photographic process, that is, as a so called laser printer. It is also possible that the printing section is a printer of some other image forming method.

Figure 2:
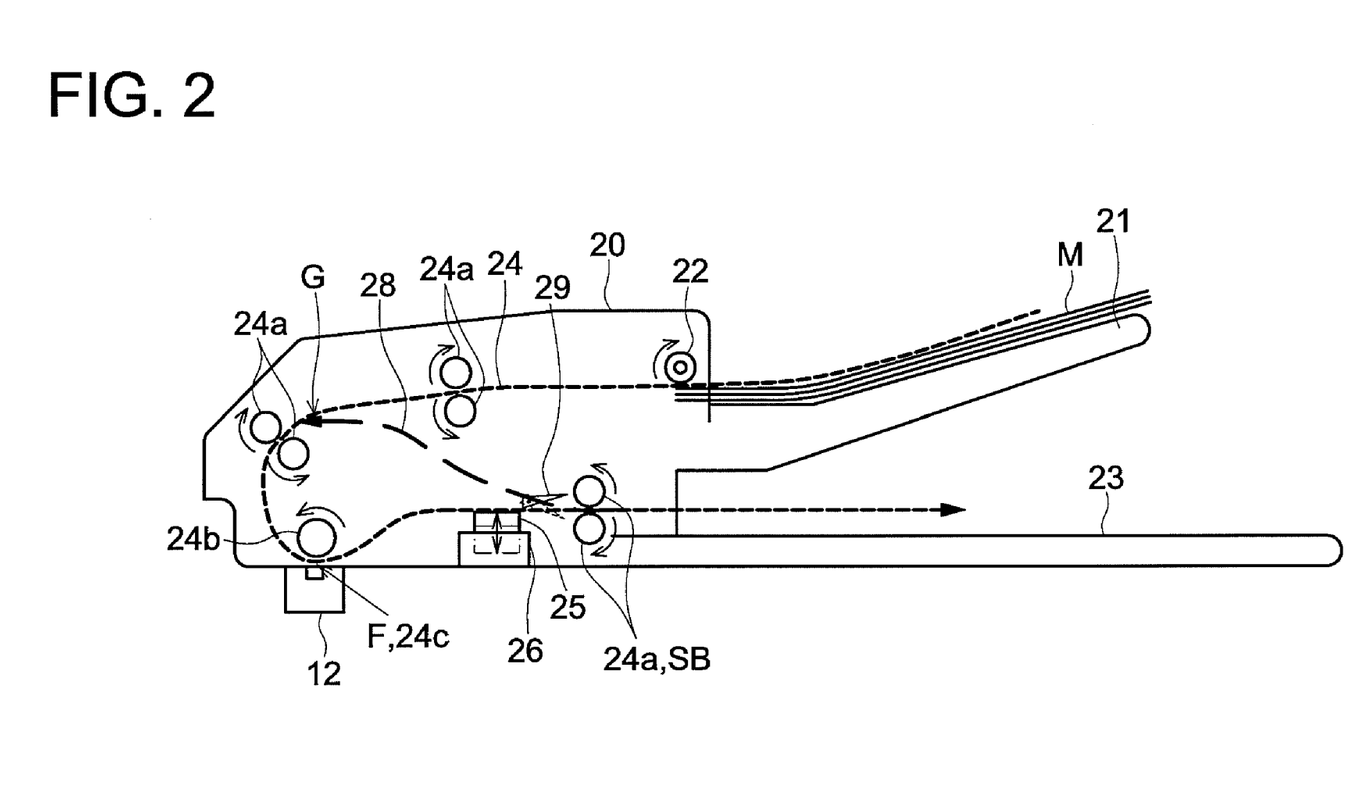
FIG. 2 is an explanatory diagram showing the configuration of an automatic document feeding apparatus having an image forming apparatus according to a preferred embodiment of the present invention.

FIG. 2 shows an automatic document feeding apparatus 20 and a reading section 12. The automatic document feeding apparatus 20 is provided with a document tray 21 on which it is possible to place a plurality of sheets of the original document M, a feed roller 22 that separates and feeds out one sheet at a time from the top of the document M placed on the document tray 21, a normal conveying path 24 (the conveying path indicated by broken (small) lines in the figure) for conveying the document M fed out by the feed roller 22 to the document discharge tray 23 via the reading out position F, and a heating unit 25 that is placed at a prescribed position on the downstream side of the reading out position F and that heats the document M that has passed the normal conveying path 24 to a temperature that makes the decolorizable pigment colorless.

The normal conveying path 24 is configured to have guide walls not shown in the figure but provided along the normal conveying path 24, a plurality of pairs of conveying rollers 24a that are placed at suitable locations and that grip the document at its front and back surfaces, a pinch roller 24b that pushes the document from its back surface at the reading out position F so that the document is in close contact with the reading out position F, and a conveying motor not shown in the figure but that rotationally drives the conveying rollers 24a and the pinch roller 24b, etc. The normal conveying path 24 constitutes a horizontal U shaped path that starts from the document tray 21 and reaches the document discharge tray 23 below it, the reading out position F is somewhat on the downstream side of the bending part of the U shape, and a slit 24c is provided in the guide wall of the normal conveying path 24 at the part of the reading out position F. The reading section 12 reads out a document through this slit 24c.

The heating unit 25 is configured using an electric heater that generates heat due to the passage of an electric current. The heating unit 25 is supported by a shifting part 26, and the shifting part 26 is fixed to the base, not shown in the figure, of the automatic document feeding apparatus 20. The shifting part 26 shifts the heating unit 25 from and to the sheet surface contacting position (indicated by the continuous lines in the figure) at which the heating surface of the heating unit 25 contacts (here, pushes against so as to be in close contact with) the document that passes through the normal conveying path 24 and a sheet surface non-contacting position (indicated in the figure by the short broken line) at which the heating surface is separated from the document. For example, the shifting part 26 is configured to have a spring that presses the heating unit 25 to the sheet surface non-contacting position and a solenoid, etc., which opposes that spring and shifts the heating unit 25 to the sheet surface contacting position when an electric current is passed through it.

Further, the automatic document feeding apparatus 20 is provided with a switch back path 28 (the path indicated by long broken line in the figure) in which the document that has passed said reading out position F is turned upside down and is fed again to the upstream side of the reading out position F. The switch back path 28 is provided with guide walls forming the path of the document and a switching tab 29 for changing the path of the document. The switching tab 29 is normally pressed by a spring so that its tip is pointing somewhat upwards towards the normal position (indicated by the continuous line in the figure) and the tip is made to go to the somewhat downward reversing position (the position indicated by the broken lines in the figure) when current is passed through the solenoid thereby opposing the force of the spring.

When the document is fed back to the upstream side of the reading out position F by turning upside down the document by the switch back path 28, the following controls are carried out by the control section 11. The switching tab 29 is reversed at the time when the trailing edge of the document is just before the switch back control roller SB which is a conveying roller 24*a* that is closest to the document discharge tray 23, and also the direction of rotation of the switch back control roller SB is reversed. Because of this, the document that is conveyed in the reverse direction due to the reverse rotation of the switch back control roller SB is guided by the switching tab 29 that has been displaced to the reversing position and proceeds towards the switch back path 28, and enters again the normal conveying path 24 at the merging position G on the upstream side of the reading out position F. At this time, the top and bottom surfaces of the document would have been turned upside down. After that, after the trailing edge of the document progressing along the switch back path 28 has passed the selection tab 29, control is carried out so that the orientation of the selection tab 29 and the direction of rotation of the switch back control roller SB are returned to their original conditions.

Further, a document sensor is provided in the document tray 21 to detect whether or not any document is present and to detect the size of the document that has been loaded. In addition, sensors are provided along the normal conveying path 24 and the switch back path 28 to detect the presence or absence of a document, so as to detect the timing at which the document passes those locations and to detect a jammed document. For example, with said sensor being provided in the vicinity of the upstream side of the switch back control roller SB, controls are carried out such as, reversing the switch back control roller SB at the time at which this sensor detects the trailing edge of the document, or the control of returning the direction of rotation of the switch back control roller SB to the original direction, and the control of changing the orientation of the selection tab 29.

Next, the operation of reading out the document in the image forming apparatus 10 is described here.

Figure 3:
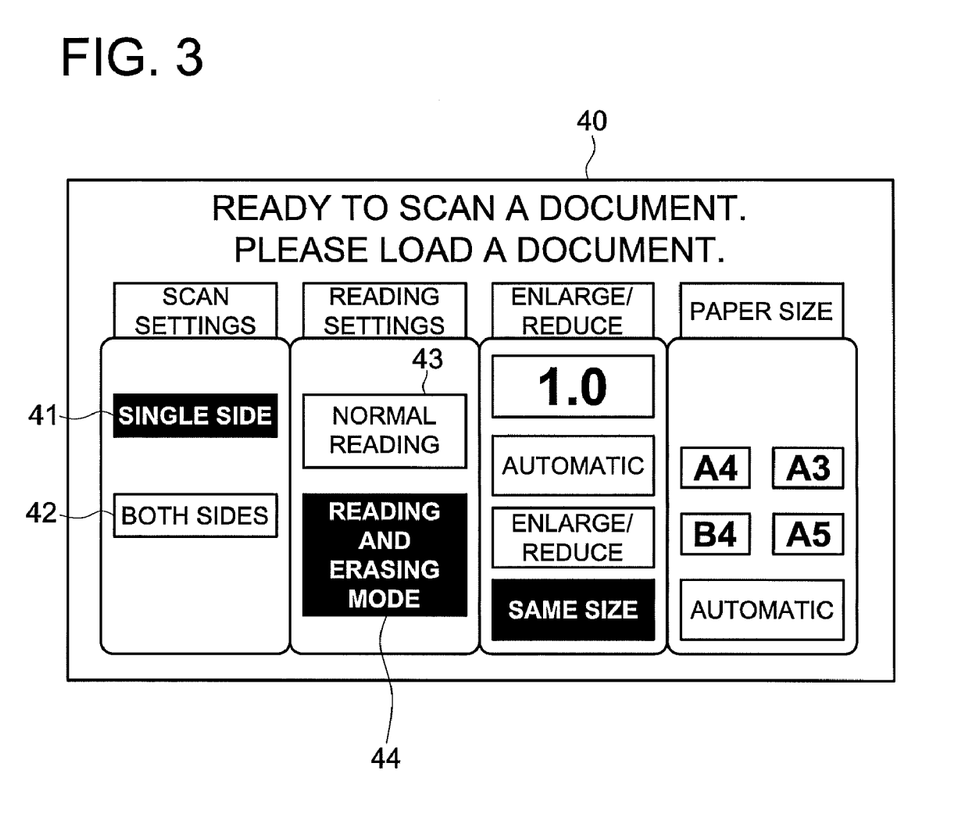
FIG. 3 is a front view diagram showing an example of the reading settings screen displayed in the operation and display section of an image forming apparatus according to a preferred embodiment of the present invention.

FIG. 3 shows an example of the reading settings screen 40 displayed in the operation and display section 15 of the image forming apparatus 10. The contents displayed in the operation and display section 15 are controlled by the control section 11. In the reading settings screen 40 are displayed the single side button 41 to instruct selecting the single side (front side) mode of reading out only the front surface of the document, the both sides button 42 to instruct selecting the two sides mode of reading out both the front and back surfaces of the document, the normal reading button 43 for selecting the normal reading mode of carrying out the reading of the document without carrying out the operation of erasing the decolorizable pigment by heating, and the read and erase button 44 for selecting the read and erase mode of reading the document and also at the same time erasing the decolorizable pigment by heating. By an image forming apparatus according to a preferred embodiment, the selection section is configured by normal reading button and reading and erasing button. It is possible for the user to select whether or not to carry out the heating and erasing operation in sequence with the operation of reading out the document.

Apart from these, the operation buttons for carrying out the settings related to enlarging or reducing the size of the read out document, the operation buttons for selecting the size of the recording sheet at the time of printing out the read out original document in the case of the copying function, and the others are arranged and displayed in the reading settings screen 40.

The user makes the selection operation of pressing the single side button 41 when wishing to read only one side of the document, or by pressing the both sides button 42 when wishing to read both sides of the document. Further, when wanting to carry out only reading out of the document without carrying out the operation of heating and erasing the decolorizable pigment, the user selects the normal reading button 43, or the user selects the read and erase button 44 when wishing to carry out the operation of heating and erasing the decolorizable pigment in sequence with the operation of reading out the document.

Figure 4:
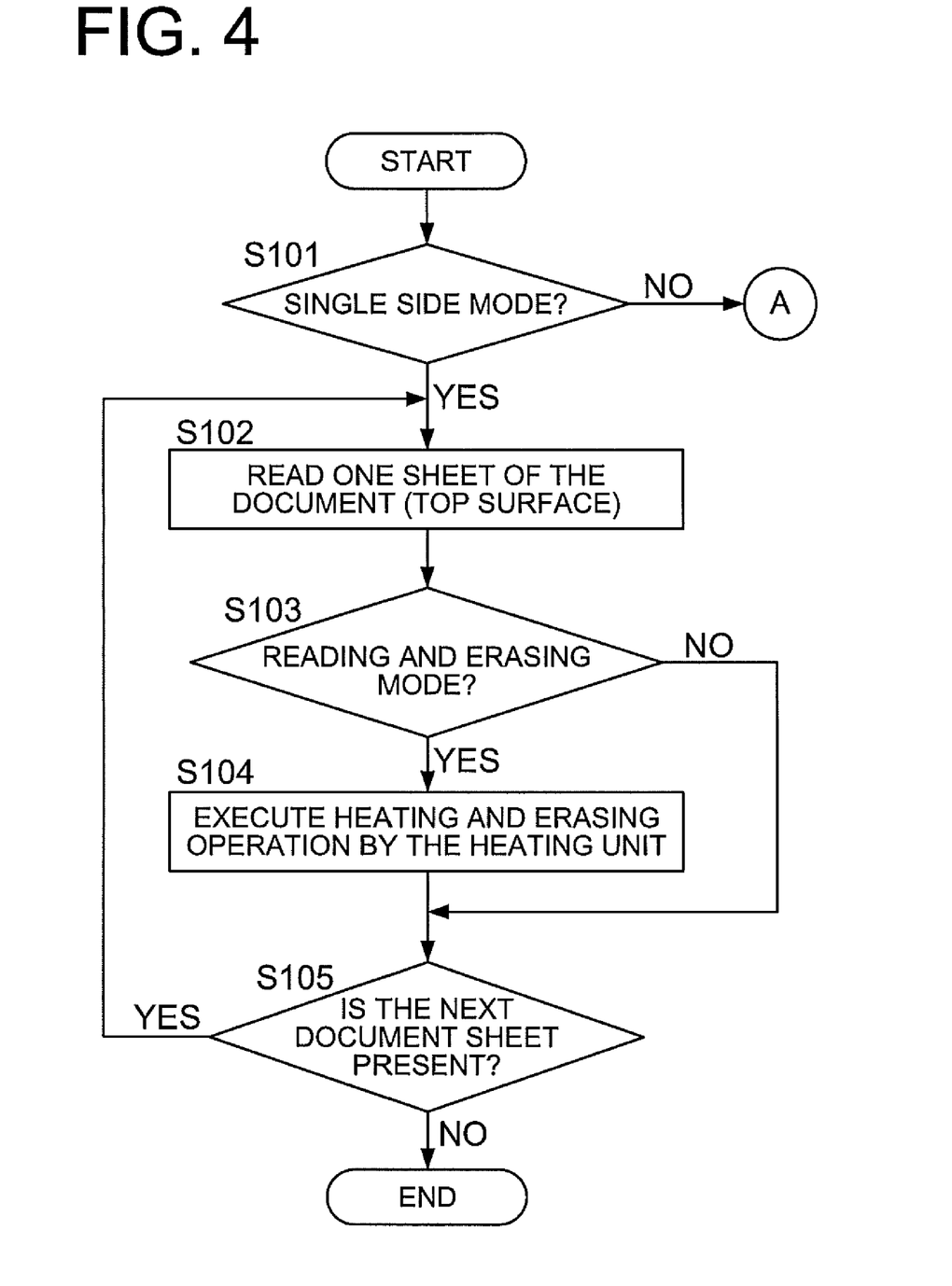
FIG. 4 is a flow chart showing the document reading operation carried out by an image forming apparatus according to a preferred embodiment of the present invention.

FIG. 4 shows the flow of the document reading operations carried out by the image forming apparatus 10. After the user has made the different types of setting operations related to reading the document in the reading settings screen 40 and has loaded the document in the document tray 21, when the Start button not shown in the figure is pressed, the control section 11 executes the document reading operations shown in FIG. 4.

The control section 11, in the setting operations related to reading, finds out if the single side mode has been set or not (Step S101), if the single side mode has been selected (Yes in Step S101), it carries out the operation of reading out of the top surface of one sheet of the original document loaded in the document tray 21 (Step S102). In detailed terms, the control section 11 carries out not only the operation of issuing the topmost sheet among the one or plurality of sheets of the original document loaded in the document tray 21 by the feeding roller 22 and discharging it out the document discharge tray 23 after passing it through the normal conveying path 24, but also the operation of repeatedly reading out in line units when that document is passing through the reading out position F using the reading section 12 and obtaining the image data of the two dimensional image, and storing this image data in the image storage section 14.

Further, the control section 11 finds out if the reading and erasing mode or the normal reading mode has been selected (Step S103), and, if the reading and erasing mode has been selected (Yes in Step S103), it executes the heating and erasing operation (Step S104). In the heating and erasing operation, the heating unit 25 is heated so that the document coming into contact with the heating surface of the heating unit 25 is heated to a temperature at which the decolorizable pigment becomes colorless, and decolorizes (erases) the part of the document that is written in a decolorizable pigment.

The temperature of the heating unit 25 when heated is set based on the temperature at which the decolorizable pigment that is the target of erasing becomes colorless, and the speed of conveying the document by the normal conveying path 24 (the time period over which the local area of the document is in contact with the heated surface of the heating unit 25). In concrete terms, the temperature is set so that the decolorizable pigment on the document that is being conveyed definitely becomes colorless while it is passing over the heating surface of the heating unit 25.

Further, in the single side mode, the heating unit 25 would already have been moved to the sheet surface contacting position. In addition, erasing by the heating and erasing operation is carried out after the document conveyed by the automatic document feeding apparatus 20 has been read out at the reading out position F and while the document is passing over and is in contact with the heating surface of the heating unit 25 that is positioned on the downstream side of the reading out position F, and the document with the decolorizable pigment erased is discharged to the document discharge tray 23.

When the normal reading mode has been selected (No in Step S103), the heating and erasing operation is not made. In other words, the heating unit 25 is maintained in the non-heating condition, and the document read out at the reading out position F is not heated but is passed over the heating unit 25 and is discharged to the document discharge tray 23. Further, in the normal reading mode, it is also possible to carry out control so as to move the heating unit 25 to the sheet non-contacting position.

When discharging the document to the document discharge tray 23 is completed (or it is just about to be completed), the control section 11, based on the result of detection by the document sensor provided in the document tray 21, judges whether or not there is a next sheet of the document, and if a next sheet of the document is present (Yes in Step S105), the operation is returned to Step S102 and the processing is continued. When there is no next sheet of the document present (No in Step S105), the processing is ended.

When the both sides reading mode has been selected (Yes in Step S101), after the heating unit 25 is moved to the sheet non-contacting position (Step S111 in FIG. 5), the reading of the (top surface of) one sheet of the document is carried out (Step S112). In detailed terms, due to the control by the control section 11, not only the operation of issuing the topmost sheet among the one or plurality of sheets of the original document loaded in the document tray 21 by the feeding roller 22 and discharging it out the document discharge tray 23 after passing it through the normal conveying path 24 is carried out, but also the operation is made of repeatedly reading out in line units when that document is passing through the reading out position F using the reading section 12 and obtaining the image data of the two dimensional image, and this image data is stored in the image storing section 14.

Figure 5:
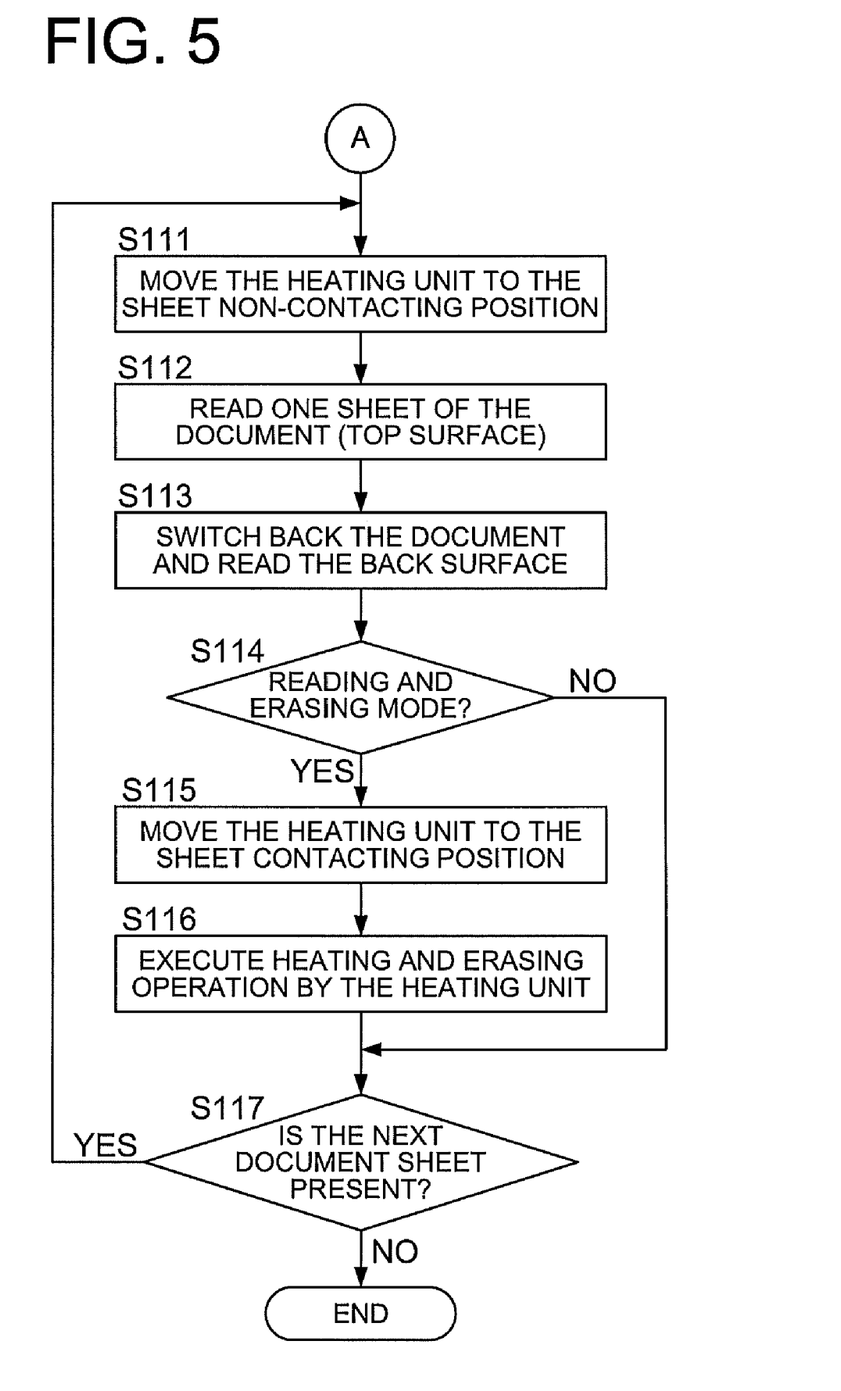
FIG. 5 is a flow chart showing the document reading operation subsequent to FIG. 4.

Further, when the trailing edge of the document sheet has passed beyond the selection tab 29 and has reached a position just before the switch back control roller SB, the selection tab 29 is shifted to the reversing position, and also the direction of rotation of the switch back control roller SB is reversed, and the document sheet is passed via the switch back path 28 and is conveyed towards the normal conveying path 24 in the condition in which the document sheet has been turned upside down. After that, in the middle of conveying the document sheet via the normal conveying path 24 and discharging it to the document discharge tray 23, the image on the back surface of the document sheet is read out by the reading section 12 at the reading out position F, and the image data of the back surface obtained by that reading is stored in the image storage section 14.

In addition, the control section 11 finds out (in Step S114) if the reading and erasing mode or the normal reading mode has been selected, and if the reading and erasing mode has been selected (Yes in Step S114), shifts the heating surface of the heating unit 25 to the sheet contacting position using the shifting section 26 (Step S115) and executes the heating and erasing operation by the heating unit 25 (Step S116). The erasing by that heating and erasing operation is carried out after the document that has been turned upside down and has passed through the switch back path 28 has been read out at the reading out position F and while the document is passing over and is in contact with the heating surface of the heating unit 25 that is positioned on the downstream side of the reading out position F, and the document with the decolorizable pigment erased is discharged to the document discharge tray 23.

Further, when the both sides mode has been selected, the reason why the heating and erasing operation is not made after the top surface of the document sheet is read out is to prevent the part written in decolorizable pigment on the back surface of the document from getting erased before it has been read out. By carrying out the decolorizing operation after the back surface has been read out, it is possible to erase the decolorizable pigment on both the top surface and back surface of the document.

When the normal reading mode has been selected (No in Step S114), not only the heating unit 25 is maintained at the sheet non-contacting position, but also the heating and erasing operation is not made, and the document whose back surface has been read out at the reading out position F is conveyed as it is, passed over the heating unit 50 without being heated, and is discharged to the document discharge tray 23.

When discharging the document to the document discharge tray 23 is completed (or it is just about to be completed), the control section 11, based on the result of detection by the document sensor provided in the document tray 21, judges whether or not there is a next sheet of the document, and if a next sheet of document is present (Yes in Step S117), the operation is returned to Step S111 and the processing is continued. When there is no next sheet of document present (No in Step S117), the processing is ended.

In the above document reading operation, in both the single side and both sides modes, at the time of carrying out the last reading of that document and discharging it, the heating and erasing operation is being made by the heating unit 25 placed on the downstream side of the reading out position F. Further, the image data stored in the image storage section 14 is output to an external terminal via the communication section 13, or is printed out by the printer section 16.

In this manner, in the image forming apparatus 10, since the heating unit 25 is placed on the downstream side of the reading out position F in the normal conveying path 24, it is possible to carry out the operation of reading the document and the heating and erasing operation of the decolorizable pigment as a single sequence of operations. Because of this, the part written in decolorizable pigment can be erased promptly after reading out the document and converting the data to an electronic form, and there is no possibility of information leakage due to putting aside the document for a long time after reading it out and converting to an electronic form until it is erased, and it is possible to acquire a high level of security.

Further, since the operation of reading out the document and the heating and erasing operation are carried out as a single sequence of operations, compared to carrying out reading out the document in a scanner and carrying out the heating and erasing operation in a separate apparatus, not only the work load and operation load on the user is reduced and the convenience is enhanced, but also it is possible to prevent information leakage due to forgetting to erase the document. In addition, since the operations are done automatically by issuing the document sheets one by one from the document tray 21 using the automatic document feeding apparatus 20, the work load on the user is small even when large quantities of documents are processed, and also it is possible to shorten the processing time.

In addition, for example, if a document which is a format sheet prepared in advance and has various types of information written on it using a writing instrument having an ink of a decolorizable pigment is read out by the image forming apparatus 10 in the reading and erasing mode, it is possible to convert the image information to its electronic form and to store it, and, at the same time, it is possible to erase the added contents that are written using a decolorizable pigment and to return that document to the formatted sheet re-usable condition (that is, the unentered condition), and it is possible to promote the reuse of paper.

Further, when the heating and erasing operation is not necessary, since it is possible to retract the heating unit 25 to the sheet non-contacting position, it is possible to suppress the deterioration of the heating surface due to contact between the heating surface and the sheets.

While a preferred embodiment of the present invention was described above with reference to the drawings, the concrete configuration need not be construed to be limited to that shown in the preferred embodiment, but any changes or additions made without deviating from the scope and intention of the present invention shall be included in the present invention.

For example, it is also possible that the automatic document feeding apparatus 20 is configured so that it does not have the switch back path 28 and the selection tab 29 and is an apparatus that is capable of reading only one side of the document sheets. In this case, the shifting section 26 need not be provided, and the heating unit 25 can be installed to be fixed at the sheet contacting position.

Although in the preferred embodiment an example of an image forming apparatus 10 provided with a printer section was shown, in the present invention, it is sufficient if the equipment has the function of an image reading apparatus that has an automatic document feeding apparatus 20, and can execute as a single sequence the operation of reading out the document using the reading section 12 and the operation of heating and erasing using the heating unit 25, and the printer function, etc., are not mandatory.

What is claimed is:

1. An image reading apparatus comprising:
an automatic document feeding apparatus which conveys a document that has a part written by pigment that becomes colorless when heated and is loaded in a document tray to a sheet discharge location via a conveying path that passes through a prescribed reading out position;
a reading section for obtaining an image information by reading out optically from the document which is conveyed by the automatic document feeding apparatus at the reading out position;
a storage section for storing the image information obtained by reading the document in the reading section;
a heating unit for heating the document to a temperature at which the pigment becomes colorless on a downstream side of the reading out position while the document passes through the conveying path;
a control section which performs a heating and erasing operation which heats the document by the heating unit so that the pigment becomes colorless in sequence with a operation of reading out by the reading section; and
a selection section for receiving a selection of a normal reading out mode for the operation of reading out of the document without the heating and erasing operation, and a reading and erasing mode for the heating and erasing operation in sequence with the operation of reading out the document,
wherein the control section executes, when the selection of the reading and erasing mode has been received via the selection section, the heating and erasing operation in sequence with the operation of reading out the document which is conveyed by the automatic document feeding apparatus by the reading section, and stops, when the selection of the normal reading out mode has been received via the selection section, the heating and erasing operation at the time of the operation of reading out of the document by the reading section conveyed by the automatic document feeding apparatus.

2. The image reading apparatus of claim 1 further comprising:
a switch back path for turning upside down the document that passed the reading out position and feeding the document again to an upstream side of the reading out position;
the control section which reads out a back surface of the document by passing through the switch back path after reading out a front surface of the document, and for executing the heating and erasing operation of the document after the back surface read out, when both sides reading out of the document was selected.

3. The image reading apparatus of claim 2 further comprising:
a shifting part for shifting the heating unit between a sheet surface contacting position at which the heating unit contacts to the document that passes through the conveying path and a sheet surface non-contacting position at which the heating unit is separated from the document.

4. The image reading apparatus of claim 1 further comprising:
a shifting part for shifting the heating unit between a sheet surface contacting position at which the heating unit contacts to the document that passes through the conveying path and a sheet surface non-contacting position at which the heating unit is separated from the document.

5. An image reading apparatus comprising:
an automatic document feeding apparatus which conveys a document that has a part written by pigment that becomes colorless when heated and is loaded in a document tray to a sheet discharge location via a conveying path that passes through a prescribed reading out position;
a reading section for obtaining an image information by reading out optically from the document which is conveyed by the automatic document feeding apparatus at the reading out position;
a storage section for storing the image information obtained by reading the document in the reading section;
a heating unit for heating the document to a temperature at which the pigment becomes colorless on a downstream side of the reading out position while the document passes through the conveying path;
a control section which performs a heating and erasing operation which heats the document by the heating unit so that the pigment becomes colorless in sequence with a operation of reading out by the reading section; and
a switch back path for turning upside down the document that passed the reading out position and feeding the document again to an upstream side of the reading out position;

the control section which reads out a back surface of the document by passing through the switch back path after reading out a front surface of the document, and for executing the heating and erasing operation of the document after the back surface read out, when both sides reading out of the document was selected.

6. The image reading apparatus of claim 5 further comprising:
a shifting part for shifting the heating unit between a sheet surface contacting position at which the heating unit contacts to the document that passes through the conveying path and a sheet surface non-contacting position at which the heating unit is separated from the document.

7. An image reading apparatus comprising:
an automatic document feeding apparatus which conveys a document that has a part written by pigment that becomes colorless when heated and is loaded in a document tray to a sheet discharge location via a conveying path that passes through a prescribed reading out position;
a reading section for obtaining an image information by reading out optically from the document which is conveyed by the automatic document feeding apparatus at the reading out position;
a storage section for storing the image information obtained by reading the document in the reading section;
a heating unit for heating the document to a temperature at which the pigment becomes colorless on a downstream side of the reading out position while the document passes through the conveying path;
a control section which performs a heating and erasing operation which heats the document by the heating unit so that the pigment becomes colorless in sequence with a operation of reading out by the reading section; and
a shifting part for shifting the heating unit between a sheet surface contacting position at which the heating unit contacts to the document that passes through the conveying path and a sheet surface non-contacting position at which the heating unit is separated from the document.

* * * * *